United States Patent
Bernat et al.

(10) Patent No.: US 10,680,976 B2
(45) Date of Patent: Jun. 9, 2020

(54) TECHNOLOGIES FOR PERFORMING SWITCH-BASED COLLECTIVE OPERATIONS IN DISTRIBUTED ARCHITECTURES

(71) Applicant: Intel Corporation, Santa Clara, CA (US)

(72) Inventors: Francesc Guim Bernat, Barcelona (ES); Kshitij A. Doshi, Tempe, AZ (US); Daniel Rivas Barragan, Cologne (DE); Alejandro Duran Gonzalez, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 327 days.

(21) Appl. No.: 15/260,638

(22) Filed: Sep. 9, 2016

(65) Prior Publication Data

US 2018/0077226 A1 Mar. 15, 2018

(51) Int. Cl.
*H04L 12/933* (2013.01)
*H04L 29/10* (2006.01)

(52) U.S. Cl.
CPC .............. *H04L 49/15* (2013.01); *H04L 29/10* (2013.01)

(58) Field of Classification Search
CPC .......................... H04L 67/1002; H04L 49/15
See application file for complete search history.

(56) References Cited

U.S. PATENT DOCUMENTS

| | | | | |
|---|---|---|---|---|
| 2002/0083210 A1* | 6/2002 | Harrison | ................. | H04L 29/06 719/310 |
| 2005/0060518 A1* | 3/2005 | Augsburg | ............. | G06F 9/3842 712/214 |
| 2006/0098619 A1* | 5/2006 | Nix | ........................ | H04M 7/126 370/352 |
| 2006/0258370 A1* | 11/2006 | Sudit | ....................... | H04L 63/10 455/456.1 |
| 2010/0061389 A1* | 3/2010 | Sindhu | ..................... | H04L 49/00 370/412 |
| 2013/0034031 A1* | 2/2013 | Sherman | ................ | H04W 40/26 370/310 |
| 2013/0103783 A1* | 4/2013 | Mannava | ............... | H04L 65/607 709/216 |
| 2015/0135337 A1* | 5/2015 | Fushman | ............ | G06F 16/9558 726/30 |
| 2015/0146637 A1* | 5/2015 | Morita | .............. | H04W 72/1252 370/329 |
| 2016/0188513 A1* | 6/2016 | Nair | ...................... | G06F 13/366 710/113 |

(Continued)

*Primary Examiner* — Michael A Keller
(74) *Attorney, Agent, or Firm* — Barnes & Thornburg LLP (57) ABSTRACT

Technologies for performing switch-based collective operations in a fabric architecture include a network switch communicatively coupled to a plurality of computing nodes. The network switch is configured to identify sub-operations of a collective operation of a collective operation request received from one of the computing nodes and identify a plurality of operands for each of the sub-operations. The network switch is additionally configured to request a value for each of the operands from a corresponding target computing node at which the respective value is stored, determine a result of the collective operation as a function of the requested operand values, and transmit the result to the requesting computing node. Other embodiments are described herein.

25 Claims, 4 Drawing Sheets

(56) References Cited

U.S. PATENT DOCUMENTS

| | | | | |
|---|---|---|---|---|
| 2016/0247331 A1* | 8/2016 | Cacabelos | ............ | G07C 5/0808 |
| 2016/0262059 A1* | 9/2016 | Butala | ................ | H04W 36/0033 |
| 2016/0314633 A1* | 10/2016 | Bonanni | ............. | G07C 9/00111 |
| 2016/0337264 A1* | 11/2016 | Murashko | ............. | H04L 47/827 |
| 2017/0068640 A1* | 3/2017 | Shahan | ............. | G06F 15/17331 |
| 2017/0288981 A1* | 10/2017 | Hong | ...................... | H04L 41/22 |

\* cited by examiner

TECHNOLOGIES FOR PERFORMING SWITCH-BASED COLLECTIVE OPERATIONS IN DISTRIBUTED ARCHITECTURES

BACKGROUND

Demands by individuals, researchers, and enterprises for increased compute performance and storage capacity of computing devices have resulted in various computing technologies developed to address those demands For example, compute intensive applications, such as enterprise cloud-based applications (e.g., software as a service (SaaS) applications), data mining applications, data-driven modeling applications, scientific computation problem solving applications, etc., typically rely on complex, large-scale computing environments (e.g., high-performance computing (HPC) environments, cloud computing environments, etc.) to execute the compute intensive applications, as well as store voluminous amounts of data. Such large-scale computing environments can include tens of hundreds (e.g., enterprise systems) to tens of thousands (e.g., HPC systems) of multi-processor/multi-core network nodes connected via high-speed interconnects (e.g., fabric interconnects in a unified fabric).

To carry out such processor intensive computations, various computing technologies have been implemented to distribute workloads across different network computing devices, such as parallel computing, distributed computing, etc. In support of such distributed workload operations, multiprocessor hardware architecture (e.g., multiple multi-core processors that share memory) has been developed to facilitate multiprocessing (i.e., coordinated, simultaneous processing by more than one processor) across local and remote shared memory systems using various parallel computer memory design architectures, such as non-uniform memory access (NUMA), and other distributed memory architectures.

As a result of the distributed computing architectures, information for a given application can be stored across multiple interconnected computing nodes. As such, retrieving the distributed information is often performed by broadcasting request messages via multicast techniques (e.g., one-to-many or many-to-many message distribution) capable of sending messages addressed to a group of target computing devices simultaneously. However, as distributed systems grow in size and scale, bandwidth and hardware (e.g., memory, processors, etc.) availability can become strained.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media (e.g., memory, data storage, etc.), which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
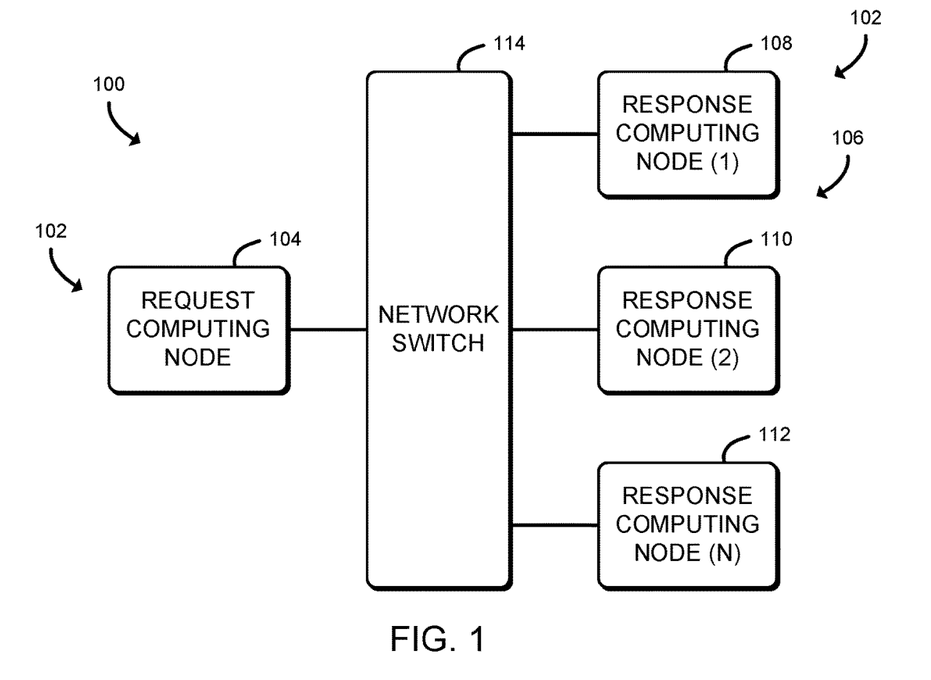
FIG. 1 is a simplified block diagram of at least one embodiment of a system for performing switch-based collective operations in a distributed architecture that includes multiple computing nodes communicatively coupled via a network switch.

Referring now to FIG. 1, in an illustrative embodiment, a system 100 for performing switch-based collective operations in a distributed architecture includes multiple computing nodes 102 communicatively coupled via a series of fabric interconnects to a network switch 114. The illustrative computing nodes 102 includes a request computing node 104 communicatively coupled to an ingress side of the network switch 114 for receiving messages, as well as multiple response computing nodes 106 communicatively coupled to an egress side of the network switch 114 for transmitting messages. It should be appreciated that while the network switch 114 is referred to herein as having an ingress side interfacing with the request computing node 104 and an egress side interfacing with the response computing nodes 106, each of the ingress and egress sides are capable of transmitting and receiving network traffic (e.g., network packets, messages, datagrams, etc.) as described herein.

The illustrative response computing nodes 106 include a first response computing node, which is designated as response computing node (1) 108, a second response computing node, which is designated as response computing node (2) 110, and a third response computing node, which is designated as response computing node (N) 112 (i.e., the "Nth" response computing node of the response computing nodes 106, wherein "N" is a positive integer and designates one or more additional response computing nodes 106). It should be appreciated that, in other embodiments, there may be any number of computing nodes 102 (e.g., other request computing nodes 104, other response computing nodes 106, etc.) coupled to the illustrative network switch 114 or another network switch 114 in the system 100. Accordingly, there may be multiple network switches 114 in other embodiments. It should be further appreciated that, in such embodiments, multiple network switches 114 may be connected, or daisy chained, to each other.

In use, the network switch 114 receives a collective operation request from the request computing node 104 that includes an operation for the network switch 114 to calculate and return a result of the calculated operation to the request computing node 104. For example, the collective operation request may be initiated by an application running on a host node, such as the request computing node 104 or another computing device communicatively coupled to the request computing node 104 (e.g., via a network router or another network switch 114).

Upon receiving the collective operation request, the network switch 114 identifies the response computing nodes 106 at which data (e.g., variable values, operands, inputs, etc.) corresponding to the operation is stored and transmits unicast "get" messages to each of the identified response computing nodes 106 (i.e., target response computing nodes 106) based on the operands, or expressions, of the operation. It should be appreciated that the data corresponding to the operation to be requested may be prioritized based on operators of the operation, such as may be based on the order of operations or other rules that may effectuate an order of precedence or priority of one or more data to be requested before one or more other data.

Upon receiving the requested data, the network switch 114 performs a calculation on the operands, expressions, or sub-operation of the requested operation. The network switch 114 is configured to iteratively repeat the identification of the target response computing nodes 106, the transmission of unicast "get" messages to request data from the identified response computing nodes 106, and perform a subsequent calculation on the received data until a final result of the operation can be calculated and returned to the applicable request computing node 104. Accordingly, unlike present technologies that multicast "get" requests to multiple response computing nodes 106 by way of a traditional network switch and perform the calculation upon receiving a response to all of the "get" requests, the use of collective operation requests reduces the pressure (i.e., network traffic) between the request computing node 104 and the network switch 114 by limiting the number of messages transmitted therebetween, as well as reducing the load on cache, memory, and/or processor(s) of the request computing node 104.

The computing nodes 102 may be embodied as any type of compute and/or storage device that is capable of performing the functions described herein, such as, without limitation, a server (e.g., stand-alone, rack-mounted, blade, etc.), a network appliance (e.g., physical or virtual), a web appliance, a distributed computing system, and/or a multiprocessor-based system. As described previously, the illustrative computing nodes 102 include the request computing node 104 and the response computing nodes 106; however, it should be appreciated that the computing nodes 102 may include additional and/or alternative computing nodes, such as controller nodes, network nodes, utility nodes, etc., which are not shown to preserve clarity of the description.

Figure 2:
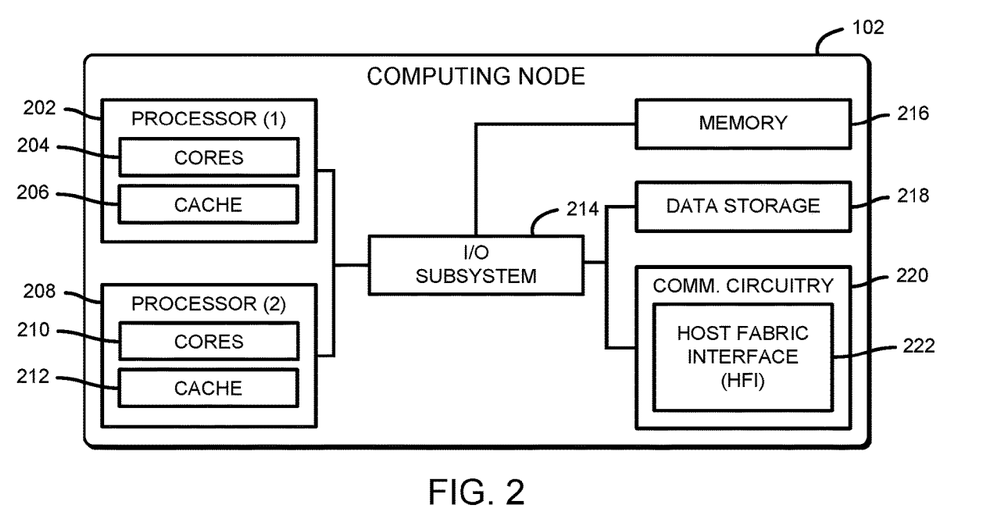
FIG. 2 is a simplified block diagram of at least one embodiment of one of the computing nodes of the system of FIG. 1.

As shown in FIG. 2, an illustrative computing node 102 includes a first processor, designated as processor (1) 202, a second processor, designated as processor (2) 208, an input/output (I/O) subsystem 214, a main memory 216, a data storage device 218, and communication circuitry 220. Of course, it should be appreciated that one or more of the computing nodes 102 may include other or additional components, such as those commonly found in a computing device (e.g., peripheral devices, other processing/storage hardware, etc.), in other embodiments. Additionally, in some embodiments, one or more of the illustrative components may be incorporated in, or otherwise form a portion of, another component. For example, cache memory of the computing node 102 (e.g., cache memory 206, 212), or portions thereof, may be incorporated in one or both of the processors 202, 208 in some embodiments. Further, in some embodiments, one or more of the illustrative components may be omitted from the computing node 102. For example, although the illustrative computing node 102 includes two processors 202, 208, the computing node 102 may include a greater number of processors in other embodiments.

Each of the processors 202, 208 (i.e., physical processor packages) may be embodied as any type of multi-core processor capable of performing the functions described herein, such as, but not limited to, a single physical multi-processor core chip, or package. The illustrative processor (1) 202 includes a number of processor cores 204, while the illustrative processor (2) 208 similarly includes a number of processor cores 210. As described previously, each of the processors 202, 208 includes more than one processor core (e.g., 2 processors cores, 4 processors cores, 8 processors cores, 16 processors cores, etc.).

Each of processor cores 204, 210 is embodied as an independent logical execution unit capable of executing programmed instructions. In some embodiments, the processor cores 204, 210 may include a portion of cache memory (e.g., an L1 cache) and functional units usable to independently execute programs or threads. It should be appreciated that, in some embodiments of the computing node 102 (e.g., supercomputers), the computing node 102 may include thousands of processor cores. Each of the processors 202, 208 may be connected to a physical connector, or socket, on a motherboard (not shown) of the computing node 102 that is configured to accept a single physical processor package (i.e., a multi-core physical integrated circuit).

The illustrative processor (1) 202 additionally includes a cache memory 206 and the illustrative processor (2) 208 includes a cache memory 212. Each cache memory 206, 212 may be embodied as any type of cache that the respective processor 202, 208 can access more quickly than the main memory 216, such as an on-die or on-processor cache. In other embodiments, the cache memory 206, 212 may be an off-die cache, but reside on the same system-on-a-chip (SoC) as the respective processor 202, 208. It should be appreciated that, in some embodiments, the cache memory 206, 212 may have a multi-level architecture. In other words, in such multi-level architecture embodiments, the cache memory 206, 212 may be embodied as one or more of an L1, L2, or L3 cache, for example.

The main memory 216 may be embodied as any type of volatile or non-volatile memory or data storage device capable of performing the functions described herein. In operation, the main memory 216 may store various data and software used during operation of the computing node 102, such as operating systems, applications, programs, libraries, and drivers. The main memory 216 is communicatively coupled to the processors 202, 208 via the I/O subsystem 214, which may be embodied as circuitry and/or components to facilitate input/output operations with the processors 202, 208, the main memory 216, and other components of the computing node 102. For example, the I/O subsystem 214 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 214 may form a portion of a SoC and be incorporated, along with one or both of the processors 202, 208, the main memory 216, and/or other components of the computing node 102, on a single integrated circuit chip.

The data storage device 218 may be embodied as any type of device or devices configured for short-term or long-term storage of data such as, for example, memory devices and circuits, memory cards, hard disk drives, solid-state drives, or other data storage devices. It should be appreciated that the data storage device 218 and/or the main memory 216 (e.g., the computer-readable storage media) may store various data as described herein, including operating systems, applications, programs, libraries, drivers, instructions, etc., capable of being executed by a processor (e.g., the processor 202, the processor 208, etc.) of the computing node 102.

The communication circuitry 220 may be embodied as any communication circuit, device, or collection thereof, capable of enabling wireless and/or wired communications between the computing node 102 and other computing devices (e.g., another computing node 102, the network switch 114, etc.). The communication circuitry 220 may be configured to use one or more communication technologies (e.g., wireless or wired communication technologies) and associated protocols (e.g., Internet Protocol (IP), Ethernet, Bluetooth®, Wi-Fi®, WiMAX, LTE, 5G, etc.) to effect such communication.

The illustrative communication circuitry 220 includes a host fabric interface (HFI) 222. The HFI 222 may be embodied as one or more add-in-boards, daughtercards, network interface cards, controller chips, chipsets, or other devices that may be used by the computing node 102. For example, in some embodiments, the HFI 222 may be integrated with one or both of the processors 202, 208 (e.g., on a coherent fabric within one or both of the processors 202, 208), embodied as an expansion card coupled to the I/O subsystem 214 over an expansion bus (e.g., PCI Express (PCIe)), part of a SoC that includes one or more processors, or included on a multichip package that also contains one or more processors. Additionally or alternatively, in some embodiments, functionality of the HFI 222 may be integrated into one or more components of the computing node 102 at the board level, socket level, chip level, and/or other levels. The HFI 222 is configured to facilitate the transfer of data/messages to enable tasks executing on the processors 202, 208 to access shared structures (e.g., shared physical memory) of the other computing nodes 102, such as may be necessary during parallel or distributed computing operations as described herein.

As described previously, the computing nodes 102 may be embodied as compute nodes and/or storage nodes. Accordingly, it should be appreciated that those computing nodes 102 implemented as storage nodes may generally include more data storage capacity than those computing nodes 102 that are embodied as compute nodes. Similarly, it should also be appreciated that those computing nodes 102 implemented as compute nodes may generally include more processor capability that those computing nodes 102 implemented as storage nodes. In other words, the storage nodes may be embodied as physical servers including numerous hard-disk drives (HDDs) or solid-state drives (SDDs) relative to the number of storage devices of the compute nodes, whereas the compute nodes may be embodied as physical servers including numerous processors having multiple cores relative to the number of processors of the storage nodes. However, it should be further appreciated that any of the computing nodes 102 may be implemented as a compute node and/or a storage node, regardless of the component configuration relative to the other computing nodes 102.

Referring again to FIG. 1, the network switch 114 may be embodied as any type of switching device (e.g., a crossbar switch) capable of forwarding network traffic through the fabric (e.g., via fabric interconnects) in a switched, or switching, fabric architecture, such as a switch (e.g., rack-mounted, standalone, fully managed, partially managed, full-duplex, and/or half-duplex communication mode enabled, etc.), a router, etc. As described previously, the network switch 114 relies on fabric interconnects to communicatively couple the network switch 114 to a number of respective computing nodes 102. The fabric interconnects may be embodied as one or more buses, switches, and/or networks configured to support transmission of network traffic as a function of various interconnect protocols and/or network protocols. In use, the fabric interconnects are utilized by the computing nodes 102 (e.g., via respective HFIs 222) to communicate with the network switch 114 and the other computing nodes 102 (i.e., across the interconnect fabric).

Figure 3:
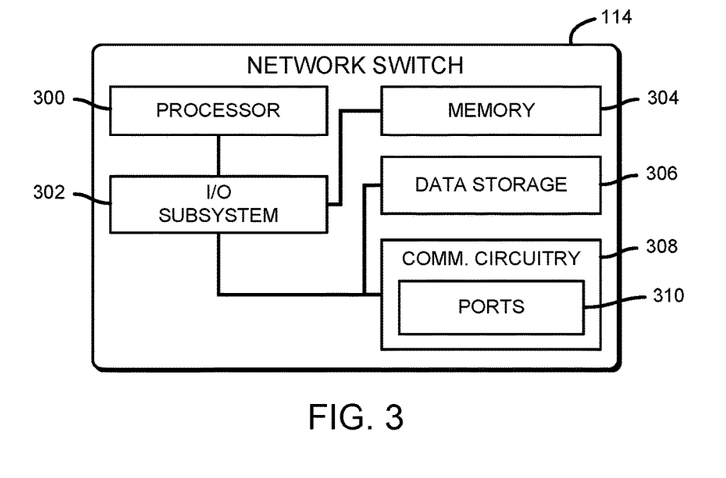
FIG. 3 is a simplified block diagram of at least one embodiment of the network switch of the system of FIG. 1.

As shown in FIG. 3, similar to the illustrative computing node 102 of FIG. 2, an illustrative switch 114 includes a processor 300, an I/O subsystem 302, a memory 304, a data storage device 306, and communication circuitry 308. As such, further descriptions of the like components are not repeated herein with the understanding that the description of the corresponding components provided above in regard to the illustrative computing node 102 of FIG. 2 applies equally to the corresponding components of the network switch 114 of FIG. 3. Of course, it should be appreciated that the network switch 114 may include other or additional components, such as those commonly found in a network traffic switching device (e.g., peripheral devices, other processing/storage hardware, etc.), in other embodiments. Additionally, in some embodiments, one or more of the illustrative components may be incorporated in, or otherwise form a portion of, another component. Further, in some embodiments, one or more of the illustrative components may be omitted from the network switch 114.

The illustrative communication circuitry 308 includes multiple switch ports 310 (i.e., input/output ports) for transmitting and receiving data to/from the network switch 114. Accordingly, in some embodiments, the network switch 114 may be configured to create a separate collision domain for each of the switch ports 310. As such, depending on the network design of the network switch 114 and the operation mode (e.g., half-duplex, full-duplex, etc.), it should be appreciated that each of the computing nodes 102 connected to one of the switch ports 310 of the network switch 114 may be configured to transfer data to any of the other computing nodes 102 at any given time, and the transmissions should not interfere, or collide.

Figure 4:
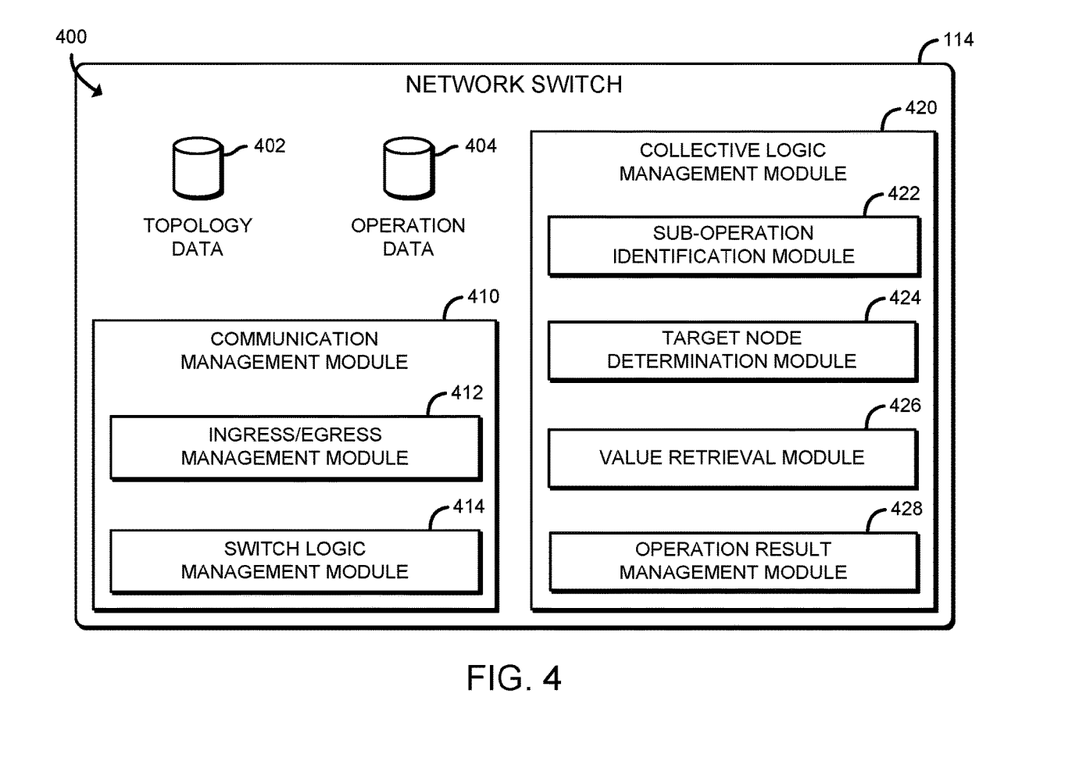
FIG. 4 is a simplified block diagram of at least one embodiment of an environment that may be established by the network switch of FIG. 3.

Referring now to FIG. 4, in an illustrative embodiment, the network switch 114 establishes an environment 400 during operation. The illustrative environment 400 includes a communication management module 410 and a collective logic management module 420. The various modules of the environment 400 may be embodied as hardware, firmware, software, or a combination thereof. As such, in some embodiments, one or more of the modules of the environment 400 may be embodied as circuitry or collection of electrical devices (e.g., a communication management circuit 410, a collective logic management circuit 420, etc.).

It should be appreciated that, in such embodiments, one or more of the communication management circuit 410 and the collective logic management circuit 420 may form a portion of the processor 300, the I/O subsystem 302, the communication circuitry 308, and/or other components of the network switch 114. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the one or more processors and/or other components of the network switch 114.

In the illustrative environment 400, the network switch 114 further includes topology data 402 and operation data 404, each of which may be stored in the main memory 304 and/or the data storage device 306 of the network switch 114. Further, each of the topology data 402 and the operation data 404 may be accessed by the various modules and/or sub-modules of the network switch 114. Additionally, it should be appreciated that in some embodiments the data stored in, or otherwise represented by, each of the topology data 402 and the operation data 404 may not be mutually exclusive relative to each other.

For example, in some implementations, data stored in the topology data 402 may also be stored as a portion of the operation data 404, and/or vice versa. As such, although the various data utilized by the network switch 114 is described herein as particular discrete data, such data may be combined, aggregated, and/or otherwise form portions of a single or multiple data sets, including duplicative copies, in other embodiments. It should be further appreciated that the network switch 114 may include additional and/or alternative components, sub-components, modules, sub-modules, and/or devices commonly found in a computing device, which are not illustrated in FIG. 4 for clarity of the description.

The communication management module 410, which may be embodied as hardware, firmware, software, virtualized hardware, emulated architecture, and/or a combination thereof as discussed above, is configured to facilitate inbound and outbound wired and/or wireless network communications (e.g., network traffic, network packets, network flows, etc.) to and from the network switch 114. To do so, the illustrative communication management module 410 includes an ingress/egress management module 412 and a switch logic management module 414. It should be appreciated that each of the ingress/egress management module 412 and the switch logic management module 414 of the communication management module 410 may be separately embodied as hardware, firmware, software, virtualized hardware, emulated architecture, and/or a combination thereof. For example, ingress/egress management module 412 may be embodied as a hardware component, while the switch logic management module 414 may be embodied as a virtualized hardware component or as some other combination of hardware, firmware, software, virtualized hardware, emulated architecture, and/or a combination thereof.

The ingress/egress management module 412 is configured to receive and process network packets from the computing nodes 102 connected to the network switch 114, such as the request computing node 104, or other switches 114, via the fabric interconnects. To do so, the ingress/egress management module 412 may be configured to enqueue received network traffic in input buffers associated with input ports of the network switch 114. Additionally, the ingress/egress management module 412 is configured to prepare and transmit network packets to other computing nodes 102, such as the response computing nodes 106, or other network switches 114, via the fabric interconnects. To do so, the ingress/egress management module 412 may be configured to dequeue network traffic from output buffers associated with output ports of the network switch 114. It should be appreciated that, in some embodiments, one or more of the output buffers may logically belong to a respective one of the output ports, but may physically be present in another location (e.g., another component) within the network switch 114.

The switch logic management module 414, which may be embodied as hardware, firmware, software, virtualized hardware, emulated architecture, and/or a combination thereof as discussed above, is configured to manage the internal path logic of the network switch 114. In other words, the switch logic management module 414 is configured to route, or forward, the network traffic through the network switch 114. For example, the switch logic management module 414 may determine an appropriate target computing device (e.g., a computing node 102, another network switch 114, etc.) for a received network packet and transfer the received network packet from an input buffer of an input port of the network switch 114 to an output buffer of an output port of the network switch 114 that corresponds to a path usable to route the received network packet through the fabric architecture to a desired destination computing device (e.g., a computing node 102 directly coupled to the network switch 114 or a computing node 102 remotely coupled to the network switch 114 via another network switch 114).

It should be appreciated that at least a portion of the functionality of the communication management module 410 and/or the switch logic management module 414 may be performed by the communication circuitry 308 of the network switch 114. In some embodiments, data usable to communicate with the other computing nodes 102 or other switches 114 of the fabric architecture, such as IP address information, flow information, etc., may be stored in the topology data 402.

The collective logic management module 420, which may be embodied as hardware, firmware, software, virtualized hardware, emulated architecture, and/or a combination thereof as discussed above, is configured to manage the collective logic. To do so, the illustrative collective logic management module 420 includes a sub-operation identification module 422, a target node determination module 424, a value retrieval module 426, and an operation result management module 428. It should be appreciated that each of the sub-operation identification module 422, the target node determination module 424, the value retrieval module 426, and the operation result management module 428 of the collective logic management module 420 may be separately embodied as hardware, firmware, software, virtualized hardware, emulated architecture, and/or a combination thereof. For example, the sub-operation identification module 422 may be embodied as a hardware component, while one or more of target node determination module 424, the value retrieval module 426, and the operation result management module 428 may be embodied as a virtualized hardware component or as some other combination of hardware, firmware, software, virtualized hardware, emulated architecture, and/or a combination thereof.

The sub-operation identification module 422 is configured to determine a number of sub-operations of a received collective operation request. For example, the sub-operation identification module 422 may analyze an operation of a received collective operation request to determine a number of sub-operations (e.g., operands, variables, inputs, etc.) associated with the operation and prioritize the sub-operations for corresponding value retrieval, such as may be prioritized based on the order of operations. The target node determination module 424 is configured to determine in which of the computing nodes 102 the corresponding value(s) of the sub-operations is stored. The value retrieval module 426 is configured to generate value request messages (e.g., unicast messages) and transmit the value request messages to the determined computing nodes 102. The value retrieval module 426 is further configured to receive responses to the transmitted value request messages and parse the received responses for the returned values.

The operation result management module 428 is configured to determine a result of each sub-operation based on the returned values and the applicable operator(s), as well as a total result of the operation based on the result of each sub-operation. In some embodiments, the returned values, the result of each sub-operation, and/or the total result of the received operations may be stored in the operation data 404. For example, in some embodiments, the operation data 404 may include a table usable to track response values and results of the sub-operation and/or operations. It should be appreciated that, in such embodiments, the operation result management module 428 may be configured to manage the table (e.g., add values and/or results to the table, remove values and/or results from the table, update values and/or results of the table, etc.). In other embodiments, the received response values may be stored in a register, while data to track and store response messages may be stored in the table. In some embodiments, the operation result management module 428 may be configured to interface with an arithmetic logic unit of the network switch 114 capable of operating on two or more values at a time.

Figure 5A:
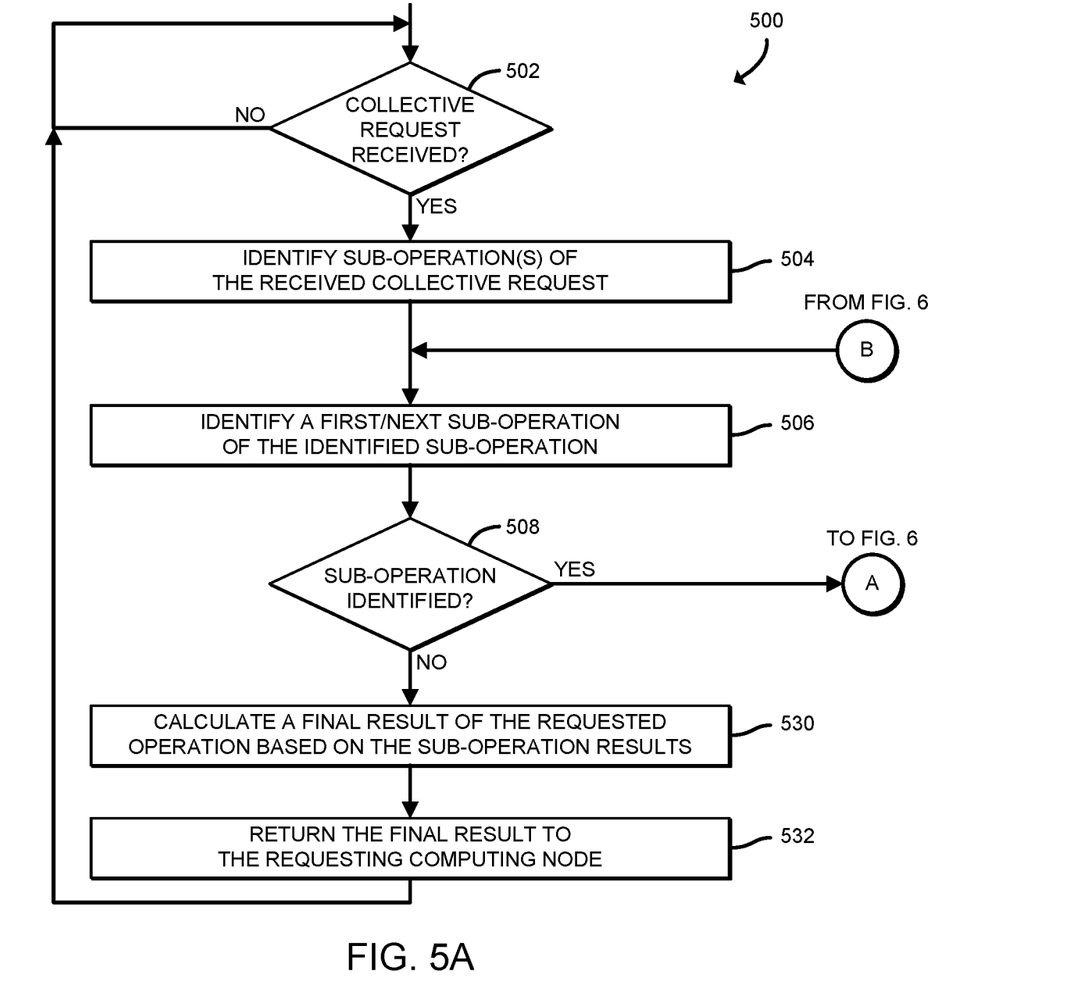
FIGS. 5A-5B is a simplified flow diagram of at least one embodiment of a method for performing switch-based collective operations that may be executed by the network switch of FIG. 3.
Figure 5B:
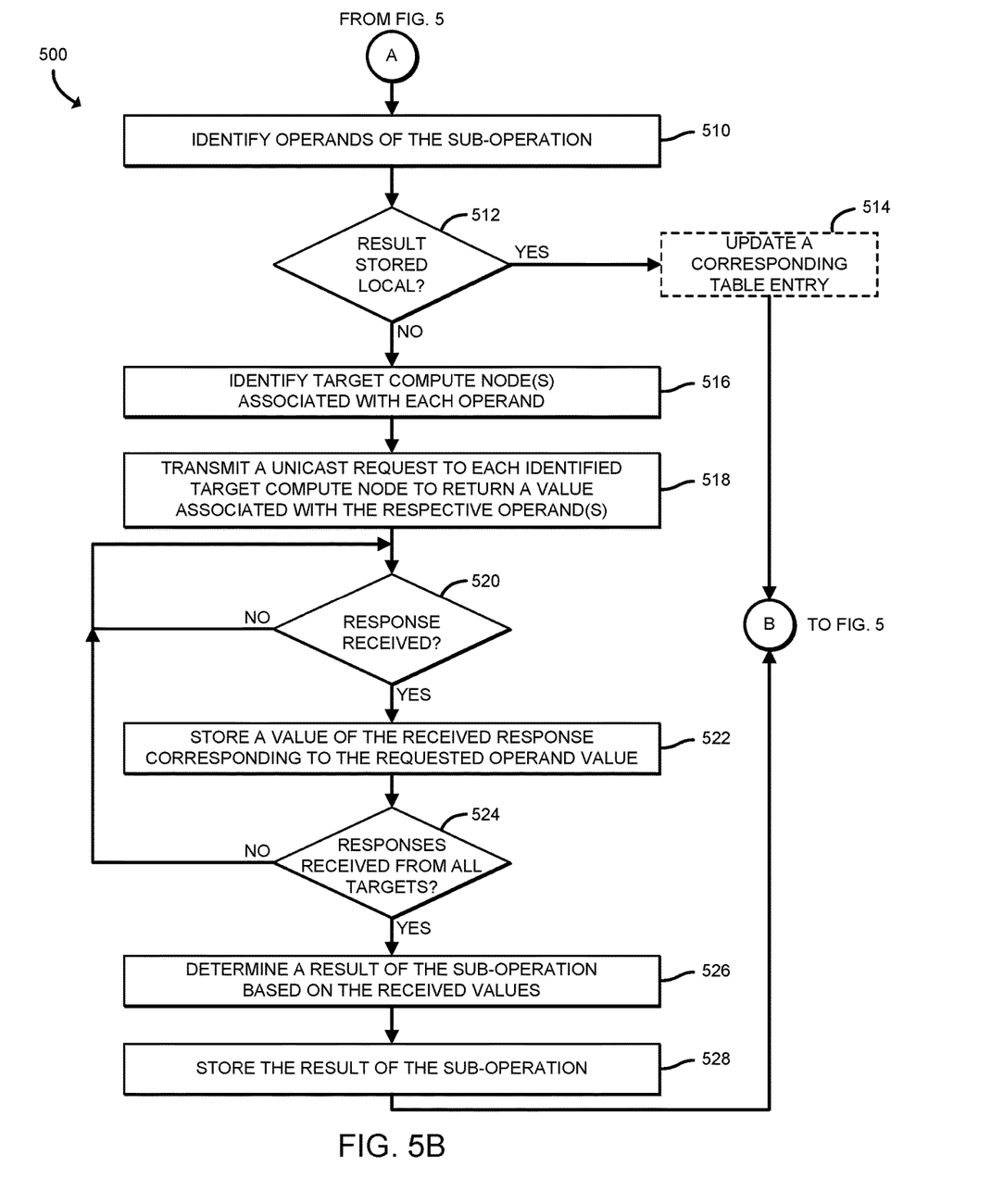

Referring now to FIGS. 5A and 5B, in use, the network switch 114 may execute a method 500 for performing switch-based collective operations. The method 500 begins in block 502, in which the network switch 114 determines whether a collective operation request has been received. As described previously, the collective operation request may be initiated by an application running on a host node, such as the request computing node 104 or another computing device communicatively coupled to the request computing node 104 (e.g., via a network router or another network switch 114). Accordingly, in such embodiments, a handle associated with the application may be included with the collective operation request, such that the handle may be usable by software running on target computing nodes to identify applicable values associated with the application.

In some embodiments, a discovery operation may be performed prior to transmission of the collective operation request. For example, the discovery operation may be performed to determine which collective operations are supported at a particular network switch 114. In some embodiments, the discovery may be performed a read only machine-specific register (MSR). Additionally or alternatively, in some embodiments, the network switch 114 may include an elasticity enabling capability such that if the network switch 114 determines that resources (e.g., processor, memory, etc.) of the network switch 114 are limited or unavailable (e.g., available resources below a threshold), the network switch 114 may be configured to push the collective operation back to the request computing node 104 (e.g., to the HFI of the request computing node 104).

If a collective operation request has been received, the method 500 loops back to block 502 to determine whether an operation request has been received; otherwise, the method 500 advances to block 504. In block 504, the network switch 114 identifies one or more sub-operations of the collective operation request received in block 502. In block 506, the network switch 114 identifies a first sub-operation of the one or more sub-operations of the collective operation request identified in block 504. As also described previously, the network switch may also prioritize the sub-operations, such as may be prioritized based on the order of operations. Accordingly, in such embodiments, the network switch 114 may identify the first sub-operation based on a priority assigned to the sub-operation.

In block 508, the network switch 114 determines whether a sub-operation has been identified. If so, the method 500 branches to block 510 of FIG. 5B; otherwise, the method branches to block 530, which is described below. In block 510, the network switch 114 identifies the operands of the identified sub-operation. In block 512, the network switch 114 determines whether a value of one or more of the identified operands or a result of the identified sub-operation is presently stored local to the network switch 114 (e.g., based on a previously performed sub-operation or prior receipt of applicable values corresponding to operands of the present sub-operation to be calculated). It should be appreciated that, in some embodiments, the network switch 114 may return a result of a collective operation to the requesting computing node (e.g., in a lazy evaluation mode) if the result of the collective operation is presently stored local to the network switch 114.

If the sub-operation result is stored local to the network switch 114, the method branches to block 514, in which the network switch may update an entry in a table of results corresponding to the sub-operation, and the operation received in the collective operation request, before the method 500 returns to block 506 of FIG. 5A to identify a next sub-operation of the sub-operations identified in block 504. Otherwise, if the sub-operation result is not stored local to the network switch 114, the method 500 branches to block 516, in which the network switch 114 identifies one or more target computing nodes (e.g., one or more of the response computing nodes 106) from which a value corresponding to an operand of the sub-operation is presently stored. In some embodiments, the network switch 114 may identify the one or more target computing nodes based on information received from the request computing node 104. For example, the network switch may receive (e.g., with the collective operation request) a list of target computing nodes, a list of identifiers (e.g., handles, parameters, addresses, descriptors, etc.) for each target computing node associated with the collective operation.

It should be appreciated that, under certain conditions, one or more values corresponding to one or more operands of the sub-operation may be presently stored by the network switch 114. Accordingly, in such embodiments, the network switch 114 may only identify the target computing nodes associated with the remaining operands for which no corresponding value is presently stored. In block 518, the network switch 114 transmits a unicast request to each target computing node identified in block 516. As described previously, more than one network switch 114 may be communicatively coupled such that multiple levels of network switches 114 are chained together. In such embodiments, the first-level network switch 114 (i.e., the network switch 114 directly coupled to the request computing node 104) may transmit a unicast message requesting a network switch 114 at another level to return one or more operands or a result of a sub-operation performed by the sub-level network switch 114 based on values of operands retrieved by the sub-level network switch 114.

It should be appreciated that, in some embodiments, a target computing node may additionally or alternatively receive an operation to be performed local to the target computing node. For example, each of the operands of a particular sub-operation may be stored at a particular target computing device and the unicast message may include the sub-operation and an indication of the operands thereof. In such embodiments, the target computing node may perform the calculation locally and return a result of the calculation to the network switch 114.

In block 520, the network switch 114 determines whether a previously unreceived response corresponding to one of the transmitted unicast requests has been received. It should be appreciated that, in some embodiments, the network switch 114 may return an acknowledgment message in response to having received the response from the target computing node. It should be further appreciated that, in some embodiments, the unicast request transmitted in block 518 may include an indication that the target computing device is to calculate a result of a sub-operation based on operands stored at the target computing device.

If the network switch 114 determines a previously unreceived response corresponding to one of the transmitted unicast requests has been received, the method 500 advances to block 522, in which the network switch 114 stores a value associated with the received response. For example, the result of the sub-operation may be stored in a table that may include response values and/or results of operations (e.g., results of sub-operations and/or total results of operations). In block 524, the network switch 114 determines whether a response has been received for each of the requests transmitted in block 518. If not, the method 500 returns to block 520 to continue to monitor for received responses; otherwise, the method 500 advances to block 526, in which the network switch 114 determines a result of the sub-operation based on the values received with the responses from the target computing nodes.

In block 526, the network switch 114 stores the result of the sub-operation before the method 500 returns to block 506 of FIG. 5A. In some embodiments, the result of the sub-operation may be stored in the aforementioned table. It should be appreciated that the calculations performed in block 526 and the storage of the results thereof performed in block 528 may be performed in parallel with block 506. In other words, it should be appreciated that, in some embodiments, the network switch 114 may perform calculations on the sub-operations at the same time as request messages are being transmitted and responses including corresponding values are being received.

Referring again to block 508 of FIG. 5A, if the network switch 114 determines a sub-operation has not been identified (i.e., there are no outstanding sub-operations), the method 500 branches to block 530. In block 530, the network switch 114 calculates a final result of the requested operation based on the previously calculated sub-operation results. In block 532, the network switch 114 returns the final result to the requesting computing node from which the collective operation request was received in block 502. It should be appreciated that, in some embodiments, the final result may be additionally or alternatively sent to a computing node other than requesting computing node, such as a storage computing node. In such embodiments, the network switch 114 may be generalized such that a result may not be returned to the requesting computing node, but rather a code or handle to the result may be returned to the requesting computing node.

It should be appreciated that at least a portion of the method 500 may be executed by the communication circuitry 308 of the network switch 114. It should be further appreciated that, in some embodiments, the method 500 may be embodied as various instructions stored on a computer-readable media, which may be executed by the processor 300, the communication circuitry 308, and/or other components of the network switch 114 to cause the network switch 114 to perform the method 500. The computer-readable media may be embodied as any type of media capable of being read by the network switch 114 including, but not limited to, the main memory 304, the data storage device 306, other memory or data storage devices of the network switch 114, portable media readable by a peripheral device of the network switch 114, and/or other media.

EXAMPLES

Illustrative examples of the technologies disclosed herein are provided below. An embodiment of the technologies may include any one or more, and any combination of, the examples described below.

Example 1 includes a network switch for performing switch-based collective operations in a fabric architecture in which a plurality of computing nodes are communicatively coupled to the network switch in the fabric architecture, the network switch comprising a processor; and one or more data storage devices having stored therein a plurality of instructions that, when executed by the processor, cause the network switch to identify one or more sub-operations of a collective operation request received from a remote computing node; identify, for each of the one or more sub-operations, a plurality of operands; identify, for each of the plurality of operands, one or more target computing nodes at which corresponding values of one or more of the plurality of operands is stored; transmit a request to each of the identified target computing nodes, wherein the request includes an indication to return a value stored at the respective target computing node that corresponds to one or more of the plurality of operands for which a value is stored at the respective identified target computing nodes; receive a response from each of the identified target computing nodes, wherein the response includes an operand value that corresponds to the respective one or more of the plurality of operands; determine, for each of the one or more sub-operations, a result based on at least a portion of the received operand values; determine a final result as a function of the determined results for each of the one or more sub-operations; and transmit the final result to the remote computing node.

Example 2 includes the subject matter of Example 1, and wherein to transmit the request to each of the identified target computing nodes comprises to transmit the request via a unicast transmission to each of the identified target computing nodes.

Example 3 includes the subject matter of any of Examples 1 and 2, and wherein to identify the one or more sub-operations of the collective operation request received from the remote computing node comprises to identify the one or more sub-operations of the collective operation request received from an application executed on the remote computing node.

Example 4 includes the subject matter of any of Examples 1-3, and wherein the collective operation request includes a handle associated with the application executed on the remote computing, and wherein the handle is usable by software to identify one or more return values associated with the application executed on the remote computing node.

Example 5 includes the subject matter of any of Examples 1-4, and wherein the plurality of instructions further cause the network switch to determine whether a value corresponding to one or more of the plurality of operands is stored local to the network switch; retrieve, in response to a determination that the value corresponding to the one or more of the plurality of operands is stored local to the network switch, operand values corresponding to each of the one or more of the plurality of operands stored local to the network switch; and determine a result for at least a portion of the one or more sub-operations based on the retrieved operand values.

Example 6 includes the subject matter of any of Examples 1-5, and wherein to determine whether the value corresponding to the one or more of the plurality of operands is stored local to the network switch comprises to determine whether the value is stored in a cache memory of the processor.

Example 7 includes the subject matter of any of Examples 1-6, and wherein the collective operation request includes a target computing node identifier for each target computing node associated with a respective one or more of the plurality of operands of the collective operation request.

Example 8 includes a network switch for performing switch-based collective operations in a fabric architecture in which a plurality of computing nodes are communicatively coupled to the network switch in the fabric architecture, the network switch comprising a collective logic management switch circuit to identify one or more sub-operations of a collective operation request received from a remote computing node; identify, for each of the one or more sub-operations, a plurality of operands; and identify, for each of the plurality of operands, one or more target computing nodes at which corresponding values of one or more of the plurality of operands is stored; and a communication management circuit to transmit a request to each of the identified target computing nodes, wherein the request includes an indication to return a value stored at the respective target computing node that corresponds to one or more of the plurality of operands for which a value is stored at the respective identified target computing nodes; and receive a response from each of the identified target computing nodes, wherein the response includes an operand value that corresponds to the respective one or more of the plurality of operands, wherein the collective logic management switch circuit is further to determine, for each of the one or more sub-operations, a result based on at least a portion of the received operand values; and determine a final result as a function of the determined results for each of the one or more sub-operations, and wherein the communication management circuit is further to transmit the final result to the remote computing node.

Example 9 includes the subject matter of Example 8, and wherein to transmit the request to each of the identified target computing nodes comprises to transmit the request via a unicast transmission to each of the identified target computing nodes.

Example 10 includes the subject matter of any of Examples 8 and 9, and wherein to identify the one or more sub-operations of the collective operation request received from the remote computing node comprises to identify the one or more sub-operations of the collective operation request received from an application executed on the remote computing node.

Example 11 includes the subject matter of any of Examples 8-10, and wherein the collective operation request includes a handle associated with the application executed on the remote computing, and wherein the handle is usable by software to identify one or more return values associated with the application executed on the remote computing node.

Example 12 includes the subject matter of any of Examples 8-11, and wherein the collective logic management switch circuit is further to determine whether a value corresponding to one or more of the plurality of operands is stored local to the network switch; retrieve, in response to a determination that the value corresponding to the one or more of the plurality of operands is stored local to the network switch, operand values corresponding to each of the one or more of the plurality of operands stored local to the network switch; and determine a result for at least a portion of the one or more sub-operations based on the retrieved operand values.

Example 13 includes the subject matter of any of Examples 8-12, and wherein to determine whether the value corresponding to the one or more of the plurality of operands is stored local to the network switch comprises to determine whether the value is stored in a cache memory of the processor.

Example 14 includes the subject matter of any of Examples 8-13, and wherein the collective operation request includes a target computing node identifier for each target computing node associated with a respective one or more of the plurality of operands of the collective operation request.

Example 15 includes a method for performing switch-based collective operations in a fabric architecture that includes a network switch communicatively coupled to a plurality of computing nodes, the method comprising identifying, by the network switch, one or more sub-operations of a collective operation request received from a remote computing node of the identifying, by the network switch and for each of the one or more sub-operations, a plurality of operands; identifying, by the network switch, one or more target computing nodes for each of the plurality of operands at which corresponding values of one or more of the plurality of operands is stored; transmitting, by the network switch, a request to each of the identified target computing nodes, wherein the request includes an indication to return a value stored at the respective target computing node that corresponds to one or more of the plurality of operands for which a value is stored at the respective identified target computing nodes; receiving, by the network switch, a response from each of the identified target computing nodes, wherein the response includes an operand value that corresponds to the respective one or more of the plurality of operands; determining, by the network switch, a result for each of the one or more sub-operations based on at least a portion of the received operand values; determining, by the network switch, a final result as a function of the determined results for each of the one or more sub-operations; and transmitting, by the network switch, the final result to the remote computing node.

Example 16 includes the subject matter of Example 15, and wherein transmitting the request to each of the identified target computing nodes comprises transmitting the request via a unicast transmission to each of the identified target computing nodes.

Example 17 includes the subject matter of any of Examples 15 and 16, and wherein identifying the one or more sub-operations of the collective operation request received from the remote computing node comprises identifying the one or more sub-operations of the collective operation request received from an application executed on the remote computing node.

Example 18 includes the subject matter of any of Examples 15-17, and wherein the collective operation request includes a handle associated with the application executed on the remote computing, and wherein the handle is usable by software to identify one or more return values associated with the application executed on the remote computing node.

Example 19 includes the subject matter of any of Examples 15-18, and further including determining, by the network switch, whether a value corresponding to one or more of the plurality of operands is stored local to the network switch; retrieving, by the network switch and in response to a determination that the value corresponding to the one or more of the plurality of operands is stored local to the network switch, operand values corresponding to each of the one or more of the plurality of operands stored local to the network switch; and determining, by the network switch, a result for at least a portion of the one or more sub-operations based on the retrieved operand values.

Example 20 includes the subject matter of any of Examples 15-19, and wherein determining whether the value corresponding to the one or more of the plurality of operands is stored local to the network switch comprises determining whether the value is stored in a cache memory of the processor.

Example 21 includes the subject matter of any of Examples 15-20, and wherein the collective operation request includes a target computing node identifier for each target computing node associated with a respective one or more of the plurality of operands of the collective operation request.

Example 22 includes a network switch comprising a processor; and a memory having stored therein a plurality of instructions that when executed by the processor cause the network switch to perform the method of any of Examples 15-21.

Example 23 includes one or more machine readable storage media comprising a plurality of instructions stored thereon that in response to being executed result in a network switch performing the method of any of Examples 15-21.

Example 24 includes a network switch for performing switch-based collective operations in a fabric architecture in which a plurality of computing nodes are communicatively coupled to the network switch in the fabric architecture, the network switch comprising means for identifying one or more sub-operations of a collective operation request received from a remote computing node; means for identifying, for each of the one or more sub-operations, a plurality of operands; means for identifying, for each of the plurality of operands, one or more target computing nodes at which corresponding values of one or more of the plurality of operands is stored; and a communication management circuit to (i) transmit a request to each of the identified target computing nodes, wherein the request includes an indication to return a value stored at the respective target computing node that corresponds to one or more of the plurality of operands for which a value is stored at the respective identified target computing nodes and (ii) receive a response from each of the identified target computing nodes, wherein the response includes an operand value that corresponds to the respective one or more of the plurality of operands; means for determining, for each of the one or more sub-operations, a result based on at least a portion of the received operand values; and means for determining a final result as a function of the determined results for each of the one or more sub-operations, wherein the communication management circuit is further to transmit the final result to the remote computing node.

Example 25 includes the subject matter of Example 24, and wherein to transmit the request to each of the identified target computing nodes comprises to transmit the request via a unicast transmission to each of the identified target computing nodes.

Example 26 includes the subject matter of any of Examples 24 and 25, and wherein the means for identifying the one or more sub-operations of the collective operation request received from the remote computing node comprises means for identifying the one or more sub-operations of the collective operation request received from an application executed on the remote computing node.

Example 27 includes the subject matter of any of Examples 24-26, and wherein the collective operation request includes a handle associated with the application executed on the remote computing, and wherein the handle is usable by software to identify one or more return values associated with the application executed on the remote computing node.

Example 28 includes the subject matter of any of Examples 24-27, and further including means for determining whether a value corresponding to one or more of the plurality of operands is stored local to the network switch; means for retrieving, in response to a determination that the value corresponding to the one or more of the plurality of operands is stored local to the network switch, operand values corresponding to each of the one or more of the plurality of operands stored local to the network switch; and means for determining a result for at least a portion of the one or more sub-operations based on the retrieved operand values.

Example 29 includes the subject matter of any of Examples 24-28, and wherein the means for determining whether the value corresponding to the one or more of the plurality of operands is stored local to the network switch comprises means for determining whether the value is stored in a cache memory of the processor.

Example 30 includes the subject matter of any of Examples 24-29, and wherein the collective operation request includes a target computing node identifier for each target computing node associated with a respective one or more of the plurality of operands of the collective operation request.

The invention claimed is:

1. A network switch for performing switch-based collective operations in a fabric architecture in which a plurality of computing nodes are communicatively coupled to the network switch in the fabric architecture, the network switch comprising:
   a processor; and
   one or more data storage devices having stored therein a plurality of instructions that, when executed by the processor, cause the network switch to:
      identify one or more sub-operations of a collective operation request received from a remote computing node;
      identify, for each of the one or more sub-operations, a plurality of operands;
      identify, for each of the plurality of operands, one or more target computing nodes coupled to the network switch via the fabric architecture at which corresponding values of one or more of the plurality of operands is stored;
      transmit a request to each of the identified target computing nodes, wherein the request includes an indication to return a value stored at the respective target computing node that corresponds to one or more of the plurality of operands for which a value is stored at the respective identified target computing nodes;
      receive a response from each of the identified target computing nodes, wherein the response includes an operand value that corresponds to the respective one or more of the plurality of operands;
      determine, for each of the one or more sub-operations, a result based on at least a portion of the received operand values;
      determine a final result as a function of the determined results for each of the one or more sub-operations; and
      transmit the final result to the remote computing node.

2. The network switch of claim 1, wherein to transmit the request to each of the identified target computing nodes comprises to transmit the request via a unicast transmission to each of the identified target computing nodes.

3. The network switch of claim 1, wherein to identify the one or more sub-operations of the collective operation request received from the remote computing node comprises to identify the one or more sub-operations of the collective operation request received from an application executed on the remote computing node.

4. The network switch of claim 3, wherein the collective operation request includes a handle associated with the application executed on the remote computing, and wherein the handle is usable by software to identify one or more return values associated with the application executed on the remote computing node.

5. The network switch of claim 1, wherein the plurality of instructions further cause the network switch to:
      determine whether a value corresponding to one or more of the plurality of operands is stored local to the network switch;
      retrieve, in response to a determination that the value corresponding to the one or more of the plurality of operands is stored local to the network switch, operand values corresponding to each of the one or more of the plurality of operands stored local to the network switch; and
      determine a result for at least a portion of the one or more sub-operations based on the retrieved operand values.

6. The network switch of claim 5, wherein to determine whether the value corresponding to the one or more of the plurality of operands is stored local to the network switch comprises to determine whether the value is stored in a cache memory of the processor.

7. The network switch of claim 1, wherein the collective operation request includes a target computing node identifier for each target computing node associated with a respective one or more of the plurality of operands of the collective operation request.

8. One or more non-transitory computer-readable storage media comprising a plurality of instructions stored thereon that in response to being executed cause a network switch to:
      identify one or more sub-operations of a collective operation request received from a remote computing node;
      identify, for each of the one or more sub-operations, a plurality of operands;
      identify, for each of the plurality of operands, one or more target computing nodes coupled to the network switch via a fabric architecture at which corresponding values of one or more of the plurality of operands is stored;
      transmit a request to each of the identified target computing nodes, wherein the request includes an indication to return a value stored at the respective target computing node that corresponds to one or more of the plurality of operands for which a value is stored at the respective identified target computing nodes;
      receive a response from each of the identified target computing nodes, wherein the response includes an operand value that corresponds to the respective one or more of the plurality of operands;
      determine, for each of the one or more sub-operations, a result based on at least a portion of the received operand values;
      determine a final result as a function of the determined results for each of the one or more sub-operations; and
      transmit the final result to the remote computing node.

9. The one or more non-transitory computer-readable storage media of claim 8, wherein to transmit the request to each of the identified target computing nodes comprises to transmit the request via a unicast transmission to each of the identified target computing nodes.

10. The one or more non-transitory computer-readable storage media of claim 8, wherein to identify the one or more sub-operations of the collective operation request received from the remote computing node comprises to identify the one or more sub-operations of the collective operation request received from an application executed on the remote computing node.

11. The one or more non-transitory computer-readable storage media of claim 10, wherein the collective operation request includes a handle associated with the application executed on the remote computing, and wherein the handle is usable by software to identify one or more return values associated with the application executed on the remote computing node.

12. The one or more non-transitory computer-readable storage media of claim 8, wherein the plurality of instructions further cause the network switch to:
determine whether a value corresponding to one or more of the plurality of operands is stored local to the network switch;
retrieve, in response to a determination that the value corresponding to the one or more of the plurality of operands is stored local to the network switch, operand values corresponding to each of the one or more of the plurality of operands stored local to the network switch; and
determine a result for at least a portion of the one or more sub-operations based on the retrieved operand values.

13. The one or more non-transitory computer-readable storage media of claim 12, wherein to determine whether the value corresponding to the one or more of the plurality of operands is stored local to the network switch comprises to determine whether the value is stored in a cache memory of the processor.

14. The one or more non-transitory computer-readable storage media of claim 8, wherein the collective operation request includes a target computing node identifier for each target computing node associated with a respective one or more of the plurality of operands of the collective operation request.

15. A method for performing switch-based collective operations in a fabric architecture that includes a network switch communicatively coupled to a plurality of computing nodes, the method comprising:
identifying, by the network switch, one or more sub-operations of a collective operation request received from a remote computing node of the ;
identifying, by the network switch and for each of the one or more sub-operations, a plurality of operands;
identifying, by the network switch, one or more target computing nodes coupled to the network switch via the fabric architecture for each of the plurality of operands at which corresponding values of one or more of the plurality of operands is stored;
transmitting, by the network switch, a request to each of the identified target computing nodes, wherein the request includes an indication to return a value stored at the respective target computing node that corresponds to one or more of the plurality of operands for which a value is stored at the respective identified target computing nodes;
receiving, by the network switch, a response from each of the identified target computing nodes, wherein the response includes an operand value that corresponds to the respective one or more of the plurality of operands;
determining, by the network switch, a result for each of the one or more sub-operations based on at least a portion of the received operand values;
determining, by the network switch, a final result as a function of the determined results for each of the one or more sub-operations; and
transmitting, by the network switch, the final result to the remote computing node.

16. The method of claim 15, wherein transmitting the request to each of the identified target computing nodes comprises transmitting the request via a unicast transmission to each of the identified target computing nodes.

17. The method of claim 15, wherein identifying the one or more sub-operations of the collective operation request received from the remote computing node comprises identifying the one or more sub-operations of the collective operation request received from an application executed on the remote computing node.

18. The method of claim 17, wherein the collective operation request includes a handle associated with the application executed on the remote computing, and wherein the handle is usable by software to identify one or more return values associated with the application executed on the remote computing node.

19. The method of claim 15, further comprising:
determining, by the network switch, whether a value corresponding to one or more of the plurality of operands is stored local to the network switch;
retrieving, by the network switch and in response to a determination that the value corresponding to the one or more of the plurality of operands is stored local to the network switch, operand values corresponding to each of the one or more of the plurality of operands stored local to the network switch; and
determining, by the network switch, a result for at least a portion of the one or more sub-operations based on the retrieved operand values.

20. The method of claim 19, wherein determining whether the value corresponding to the one or more of the plurality of operands is stored local to the network switch comprises determining whether the value is stored in a cache memory of the processor.

21. The method of claim 17, wherein the collective operation request includes a target computing node identifier for each target computing node associated with a respective one or more of the plurality of operands of the collective operation request.

22. A network switch for performing switch-based collective operations in a fabric architecture in which a plurality of computing nodes are communicatively coupled to the network switch in the fabric architecture, the network switch comprising:
means for identifying one or more sub-operations of a collective operation request received from a remote computing node;
means for identifying, for each of the one or more sub-operations, a plurality of operands;
means for identifying, for each of the plurality of operands, one or more target computing nodes coupled to the network switch via the fabric architecture at which corresponding values of one or more of the plurality of operands is stored; and
a communication management circuit to (i) transmit a request to each of the identified target computing nodes, wherein the request includes an indication to return a value stored at the respective target computing node that corresponds to one or more of the plurality of operands for which a value is stored at the respective identified target computing nodes and (ii) receive a response from each of the identified target computing nodes, wherein the response includes an operand value that corresponds to the respective one or more of the plurality of operands;
means for determining, for each of the one or more sub-operations, a result based on at least a portion of the received operand values; and
means for determining a final result as a function of the determined results for each of the one or more sub-operations,
wherein the communication management circuit is further to transmit the final result to the remote computing node.

23. The network switch of claim 22, further comprising:
means for determining whether a value corresponding to one or more of the plurality of operands is stored local to the network switch;
means for retrieving, in response to a determination that the value corresponding to the one or more of the plurality of operands is stored local to the network switch, operand values corresponding to each of the one or more of the plurality of operands stored local to the network switch; and
means for determining a result for at least a portion of the one or more sub-operations based on the retrieved operand values.

24. The network switch of claim 23, wherein the means for determining whether the value corresponding to the one or more of the plurality of operands is stored local to the network switch comprises means for determining whether the value is stored in a cache memory of the processor.

25. The network switch of claim 22, wherein the collective operation request includes a target computing node identifier for each target computing node associated with a respective one or more of the plurality of operands of the collective operation request.

* * * * *